Patented Apr. 28, 1953

2,636,886

UNITED STATES PATENT OFFICE 2,636,886

URANIUM COMPLEXES OF HETEROCYCLIC DIKETONES

Hermann I. Schlesinger, Chicago, Ill., and Herbert C. Brown, Detroit, Mich., assignors to the United States of America as represented by the United States Atomic Energy Commission No Drawing. Application January 5, 1946, Serial No. 639,489

13 Claims. (Cl. 260—347.8)

This invention relates to new and useful uranium complexes and to the recovery of uranium by formation of such complexes. Specifically the invention is concerned with the complexes of uranium with heterocyclic diketones which contain ketone groups separated by a methylene group. Of particular interest are complexes obtainable from heterocyclic beta diketones wherein the carbonyl groups are linked by a single carbon atom in which at least one hydrogen atom is attached thereto.

Graphically, complexes of this type formed from hexavalent uranium as uranyl ion ($UO_2^{+2}$) and tetravalent uranium as $U^{+4}$ may be represented by the following general structures:

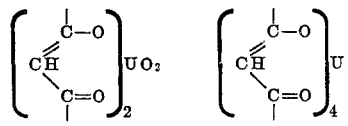

wherein one of the free bonds attached to carbon is linked to a heterocyclic ring and the other is linked to hydrogen or a radical such as alkyl, aralkyl, or a halogenated alkyl group. In such compounds the uranium is apparently linked by a covalent bond to the enolic group of the diketone and also by a coordinate bond to the other ketone group.

In accordance with the present invention, it has been found that complexes of the above described class may be prepared by reacting aqueous solutions of uranium in the tetra or hexavalent state with a diketone of the aforesaid type. The heterocyclic diketone is preferably added to the uranium in the form of an alkaline solution. After all the diketone has been thus introduced, additional base is added until the reaction mixture becomes alkaline to litmus. During this change in pH of the solution, the desired complexed compound will be observed to precipitate from the reaction mixture, usually in the form of a yellow or brown crystalline product. The precipitate obtained in this manner may then be separated by filtration or other convenient means, washed with water, and dried over a suitable drying agent.

In carrying out our invention uranium is recovered from solutions thereof by contacting the same, usually at or about room temperature with a heterocyclic beta diketone, preferably furoylacetone, to form a water insoluble uranium organic complex such as herein described. Such a complex can then be precipitated from solution or extracted with a solvent.

Suitable solvents include chloroform, benzene, ethyl acetate, carbon tetrachloride, aniline, n-hexyl alcohol, xylene, and ethyl ether. The water immiscible organic solvents used in the process of the present invention extract the uranium-organic complexes from aqueous solutions either by actual solution in the solvent or by preferential wetting of the solvent. In the case of preferential wetting, the uranium complex may appear in the organic solvent as a suspension or precipitate.

Alternatively, sufficient base may be added to render the mixture alkaline to form a solid crystalline material comprising complexed uranium. When furoylacetone is the heterocyclic beta diketone employed, a yellow crystalline solid uranyl furoylacetonate is formed. The solid organic complex of uranium such as, for example, uranyl furoylacetonate is removed from solution by filtration or other suitable means. It may be found desirable for further purification to dissolve the resulting precipitate in alcohol and reprecipitate it by the addition of water. Repeated washing with water may then be employed to secure the pure crystalline material.

Any heterocyclic diketone in which the carbonyl groups are separated by a methylene group may be used. Typical example of such compounds are furoyl benzyl acetone, furoyltrifluoracetone, and the like. Beta diketones of either 5-membered or 6-membered heterocyclic systems are suitable. Such systems include compounds having single ring heterocyclic 5-membered radicals such as furan, thiophene, and pyrrole; multi-ring heterocyclic 5-membered radicals such as coumarone, benzothiophene, and indole; single ring heterocyclic 6-membered radicals such as gamma pyrone, alpha pyrone, and pyridine; multi-ring heterocyclic 6-membered radicals such as chromone flavone, quinoline, and isoquinoline. Compounds having a beta diketone structure within the heterocyclic ring such as 1-methyl-2, 4-dioxo-1, 2, 3, 4-tetrahydropyridine are included as are compounds having the beta diketone structure within an aliphatic chain attached to a heterocyclic ring such as 2-acetoacetylpyridine and furoylacetone.

The compounds or complexes herein described are stable colored compositions probably of the chelate type. They are generally soluble in the common organic solvents and usually exhibit relatively high volatilities. As a result of their general insolubility in water, such compounds are useful in separating uranium from its aqueous solutions which contain various impurities. Also, since many of these compositions are highly colored they may be used as dyes or pigments.

The present invention may be further illustrated by the following specific examples,

Example I

To 5.0 g. of uranyl nitrate in 25 cubic centimeters of water, 3.0 cubic centimeters of furoylacetone was added. The solution changed color, but no precipitate formed. The slow addition of alkali produced a red gummy mass. The liquid was decanted and the solid material taken up in alcohol. Upon addition of water, a red oil separated, which became solid when cooled. The solid was washed repeatedly with cold water, and finally with boiling water. The color gradually became yellow. The uranyl furoylacetonate thus obtained was filtered off and after drying in a vacuum desiccator had a melting point of 172-175° C.

Example II

To 3.8 g. of uranous chloride in 25 cubic centimeters of water, 5 cubic centimeters of furoylacetone was added and the resulting mixture shaken. A brown precipitate formed in spite of the acidity of the solution. Upon adjusting the pH of the solution to a value of 4 by the addition of a small quantity of sodium hydroxide in the form of an aqueous solution, the product was transformed to a hard curdy, brown precipitate. This material was filtered off and dried in a desiccator in vacuo. The uranous furoylacetonate thus obtained melted sharply at 195° C. and remained liquid without appreciable decomposition to a temperature of 220° C. Analysis for $C_{32}H_{28}O_{12}U$: U, calc'd.; 28.14 per cent. Found; 26.44 per cent.

The invention is not limited in its application to any particular uranium isotope but is broadly applicable to the formation of complexes of all isotopes of this element.

Although the present invention has been described with reference to a specific embodiment thereof, it is not intended that such details shall be regarded as limitations except in so far as included in the accompanying claims.

What is claimed is:

1. A complex of uranium and a heterocyclic beta diketone in which the heterocyclic radical is selected from a group consisting of furan, thiophene, pyrrole, coumarone, benzothiophene, indole, gamma pyrone, alpha pyrone, pyridine, chromone, flavone, quinoline, and isoquinoline radicals, the carbonyl groups are separated by a methylene radical, and in which uranium is selected from the group consisting of tetravalent uranium and hexavalent uranium.

2. A complex of hexavalent uranium having the following general structure

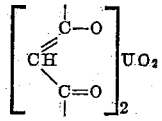

wherein one of the free bonds attached to one terminal carbon atom is linked to a heterocyclic ring and the other free bond on the opposite terminal carbon atom is attached to a member selected from the group consisting of hydrogen, alkyl, aralkyl and halogenated alkyl, the heterocyclic radical selected from the group consisting of furan, thiophene, pyrrole, coumarone, benzothiophene, indole, gamma pyrone, alpha pyrone, pyridine, chromone, flavone, quinoline, and isoquinoline radicals.

3. A complex of tetravalent uranium having the following general structure

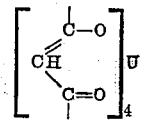

wherein one of the free bonds attached to one terminal carbon atom is linked to a heterocyclic ring and the other free bond on the opposite terminal carbon atom is attached to a member selected from the group consisting of hydrogen, alkyl, and halogenated alkyl the heterocyclic radical selected from the group consisting of furan, thiophene, pyrrole, coumarone, benzothiophene, indole, gamma pyrone, alpha pyrone, pyridine, chromone, flavone, quinoline, and isoquinoline radicals.

4. Uranyl furoylacetonate.

5. Uranous furoylacetonate.

6. In a process for the synthesis of chelate compounds of uranium and heterocyclic beta diketones in which the heterocyclic radical is selected from the group consisting of furan, thiophene, pyrrole, coumarone, benzothiophene, indole, gamma pyrone, alpha pyrone, pyridine, chromone, flavone, quinoline, and isoquinoline radicals, the carbonyl groups contained therein are separated by a methylene radical, and uranium is selected from the group consisting of tetravalent uranium and hexavalent uranium, the step which comprises reacting an aqueous solution of said uranium with said heterocyclic beta diketone.

7. In a process for the synthesis of chelate compounds of hexavalent uranium and heterocyclic beta diketones in which the heterocyclic radical is selected from the group consisting of furan, thiophene, pyrrole, coumarone, benzothiophene, indole, gamma pyrone, alpha pyrone, pyridine, chromone, flavone, quinoline, and isoquinoline radicals, and the carbonyl groups contained therein are separated by a methylene radical, the step which comprises reacting an aqueous solution of hexavalent uranium with said heterocyclic beta diketone.

8. In a process for the synthesis of chelate compounds of tetravalent uranium and heterocyclic beta diketones in which the heterocyclic radical is selected from the group consisting of furan, thiophene, pyrrole, coumarone, benzothiophene, indole, gamma pyrone, alpha pyrone, pyridine, chromone, flavone, quinoline, and isoquinoline radicals, and the carbonyl groups contained therein are separated by a methylene radical, the step which comprises reacting an aqueous solution of tetravalent uranium with said heterocyclic beta diketone.

9. A method which comprises removing uranium from an aqueous solution comprising uranium, in a valence state selected from the group consisting of tetravalent uranium and hexavalent uranium, and impurities normally associated therewith by forming a complex of the uranium and a heterocyclic beta diketone in which the heterocyclic radical is selected from the group consisting of furan, thiophene, pyrrole, coumarone, benzothiophene, indole, gamma pyrone, alpha pyrone, pyridine, chromone, flavone, quinoline, and isoquinoline radicals, and the carbonyl groups contained therein are separated by a methylene radical, and removing the complex thus formed.

10. A method which comprises removing uranium from an aqueous solution comprising hexavalent uranium and impurities normally associated therewith by forming a complex of the hexavalent uranium and a heterocyclic beta diketone in which the heterocyclic radical is selected from the group consisting of furan, thiophene, pyrrole, coumarone, benzothiophene, indole, gamma pyrone, alpha pyrone, pyridine, chromone, flavone, quinoline, and isoquinoline radicals, and the carbonyl groups contained therein are separated by a methylene radical, and removing the complex thus formed.

11. A method which comprises removing uranium from an aqueous solution comprising uranium and impurities normally associated therewith by forming a complex of the tetravalent uranium and a heterocyclic beta diketone in which the heterocyclic radical is selected from the group consisting of furan, thiophene, pyrrole, coumarone, benzothiophene, indole, gamma pyrone, alpha pyrone, pyridine, chromone, flavone, quinoline, and isoquinoline radicals, and the carbonyl groups contained therein are separated by a methylene radical, and removing the complex thus formed.

12. The process of claim 10 wherein the heterocyclic beta diketone is furoylacetone.

13. A method which comprises removing uranium from an aqueous solution comprising tetravalent uranium and impurities normally associated therewith by forming a complex of the tetravalent uranium and furoylacetone, and removing the complex thus formed.

HERMANN I. SCHLESINGER.
HERBERT C. BROWN.

No references cited.